US012069466B2

(12) United States Patent
Kyriakakis et al.

(10) Patent No.: US 12,069,466 B2
(45) Date of Patent: Aug. 20, 2024

(54) SYSTEMS AND METHODS FOR AUDIO UPMIXING

(71) Applicant: SYNG, Inc., Marina del Ray, CA (US)

(72) Inventors: Christos Kyriakakis, Venice, CA (US); Matthias Kronlachner, Venice, CA (US); Lasse Vetter, Venice, CA (US)

(73) Assignee: SYNG, Inc., Marina del Ray, CA (US)

( * ) Notice: Subject to any disclaimer, the term of this patent is extended or adjusted under 35 U.S.C. 154(b) by 65 days.

(21) Appl. No.: 17/300,939

(22) Filed: Dec. 15, 2021

(65) Prior Publication Data

US 2022/0400351 A1 Dec. 15, 2022

Related U.S. Application Data

(60) Provisional application No. 63/125,896, filed on Dec. 15, 2020.

(51) Int. Cl.

*H04S 5/00* (2006.01)
*G10L 21/0232* (2013.01)
*H04R 5/04* (2006.01)

(52) U.S. Cl.

CPC .......... *H04S 5/005* (2013.01); *G10L 21/0232* (2013.01); *H04R 5/04* (2013.01)

(58) Field of Classification Search

None

See application file for complete search history.

(56) References Cited

U.S. PATENT DOCUMENTS 8,588,427 B2 * 11/2013 Uhle ........................ H04R 5/04 381/17
9,398,294 B2 * 7/2016 Robillard ............... H04N 19/50
10,349,197 B2 * 7/2019 Jo ............................ H04S 7/30
2015/0334500 A1 11/2015 Mieth et al.

(Continued)

FOREIGN PATENT DOCUMENTS

EP 4252432 A1 10/2023
JP 2023553489 A 12/2023

(Continued)

OTHER PUBLICATIONS

International Preliminary Report on Patentability for International Application PCT/US2021/010061, Report issued Jun. 13, 2023, Mailed on Jun. 29, 2023, 07 Pgs.

(Continued)

*Primary Examiner* — Paul W Huber
(74) *Attorney, Agent, or Firm* — KPPB LLP

(57) ABSTRACT

Systems and methods for audio in accordance with embodiments of the invention are illustrated. One embodiment includes a method for upmixing audio, including receiving an audio track which includes an input plurality of channels, each channel having an encoded audio signal, decoding the audio signal, calculating a first frequency spectrum for a low frequency component of the signal using a first window, calculating a second frequency spectrum for a high frequency component of the signal using a second window, determining at least one direct signal by estimating panning coefficients, estimating at least one ambient signal based on the at least one direct signal, and generating an output plurality of channels based on the at least one direct signal and the at least one ambient signal.

28 Claims, 10 Drawing Sheets

(56) References Cited

U.S. PATENT DOCUMENTS

| | | | |
|---|---|---|---|
| 2016/0080886 | A1 | 3/2016 | De Bruijn et al. |
| 2018/0088899 | A1 | 3/2018 | Gillespie et al. |
| 2020/0367009 | A1 | 11/2020 | Family et al. |

FOREIGN PATENT DOCUMENTS

| | | | |
|---|---|---|---|
| WO | 2014033222 | A1 | 3/2014 |
| WO | 2022132197 | A1 | 6/2022 |

OTHER PUBLICATIONS

International Search Report and Written Opinion for International Application No. PCT/US2021/010061, Search completed Feb. 22, 2022, Mailed Mar. 7, 2022, 13 Pgs.

"Dolby Pro Logic II", Dolby Laboratories, Inc., Retrieved from: https://professional.dolby.com/tv/dolby-pro-logic-ii/, Printed on Nov. 14, 2020, 5 pgs.

Avendano et al., "Frequency Domain Techniques for Stereo to Multichannel Upmix", AES 22nd International Conference on Virtual, Synthetic and Entertainment Audio, Jun. 2002, 10 pgs.

Bai et al., "Upmixing and Downmixing Two-channel Stereo Audio for Consumer Electronics", Ninth IEEE International Symposium on Multimedia Workshops, Mar. 21, 2008, Taichung, Taiwan, pp. 1011-1019.

Chun et al., "Real-Time Conversion of Stereo Audio to 5.1 Channel Audio for Providing Realistic Sounds", International Journal of Signal Processing, image Processing and Pattern Recognition, vol. 2, No. 4, Dec. 2009, 10 pgs.

Chun et al., "Upmixing Stereo Audio into 5.1 Channel Audio for Improving Audio Realism", International Conference on Signal Processing, Image Processing, and Pattern Recognition, SIP, 2009, pp. 228-235.

Dressler, Roger, "Dolby Surround Pro Logic Decoder Principles of Operation", 1998, 16 pgs.

Dressler, Roger, "Dolby Surround Pro Logic II Decoder Principles of Operation", 2000, 7 pgs.

Kraft et al., "Stereo Signal Separation and Upmixing by Mid-Side Decomposition in the Frequency-Domain", Proceedings of the 18th International Conference on Digital Audio Effects (DAFx 15), Trondheim, Norway, Nov. 30-Dec. 2015, 6 pgs.

Vickers, Earl, "Frequency-Domain Two- to Three-Channel Upmix for Center Channel Derivation and Speech Enhancement", Audio Engineering Society, Convention Paper 7917, Presented at the 127th Convention, New York, NY, Oct. 9-12, 2009, 24 pgs.

* cited by examiner

SYSTEMS AND METHODS FOR AUDIO UPMIXING

CROSS-REFERENCE TO RELATED APPLICATIONS

The current application claims the benefit of and priority under 35 U.S.C. § 119(e) to U.S. Provisional Patent Application No. 63/125,896 entitled "Systems and Methods for Audio Upmixing" filed Dec. 15, 2020, which is hereby incorporated by reference in its entirety for all purposes.

FIELD OF THE INVENTION

The present invention generally relates to audio upmixing, more specifically, to generating higher channel surround sound audio signals from stereo audio signals.

BACKGROUND

Monophonic sound (or "mono") refers to sound systems that utilize a single loudspeaker (or "speaker") for reproduction. In contrast, stereophonic sound (or "stereo") uses two separate audio channels to reproduce sound from two loudspeakers on the left and right side of the listener.

Surround sound is a broad term used to describe sound reproduction that uses more than two audio channels. Surround sound systems are generally described using the format A.B, or A.B.C, where A is the number of speakers at the listener's height (the listening plane), B is the number of subwoofers, and C is the number of overhead speakers. For example, a 5.1 surround sound system has 6 audio channels, where 5 are allocated to the listening plane speakers, and 1 is allocated to the subwoofer (which may or may not be at the listening plane). As an additional example, 7.1.4 surround sound such as that found in Dolby Atmos audio systems allocates 7 channels to listening plane speakers, 1 channel to a subwoofer, and 4 channels to overhead speakers.

Audio tracks can be made for particular speaker layouts. A track may have one or more audio channels depending on the particular speaker layout it was mixed for. "Upmixing" as used herein refers to the process of converting an audio track having M channels to an audio track having N channels, where N>M. "Downmixing," in contrast, refers to the process of converting an audio track having Y channels to an audio track having X channels, where X<Y.

SUMMARY OF THE INVENTION

Systems and methods for audio in accordance with embodiments of the invention are illustrated. One embodiment includes a method for upmixing audio, including receiving an audio track which includes an input plurality of channels, each channel having an encoded audio signal, decoding the audio signal, calculating a first frequency spectrum for a low frequency component of the signal using a first window, calculating a second frequency spectrum for a high frequency component of the signal using a second window, determining at least one direct signal by estimating panning coefficients, estimating at least one ambient signal based on the at least one direct signal; and generating an output plurality of channels based on the at least one direct signal and the at least one ambient signal.

In another embodiment, the second plurality of channels comprises more channels than the first plurality of channels.

In a further embodiment, the method further includes determining a spatial representation of the audio track.

In still another embodiment, the input plurality of channels comprises two channels.

In a still further embodiment, the two channels comprise a right and left channel.

In yet another embodiment, the output plurality of channels comprises a center channel.

In a yet further embodiment, the center channel is determined using the at least one direct signal and the panning coefficients.

In another additional embodiment, a decorrelation method is applied to the resulting surround channels.

In a further additional embodiment, a decorrelation method is applied to the resulting left and right channels.

In another embodiment again, the low frequency component comprises frequencies up to 1000 Hz.

In a further embodiment again, calculating the first frequency spectrum and calculating the second frequency spectrum comprises using a Short-time Fourier transform (STFT).

In still yet another embodiment, the first window has a length suitable for the STFT to produce 2048 frequency coefficients.

In a still yet further embodiment, the second window has a length suitable for the STFT to produce 128 frequency coefficients.

In still another additional embodiment, the method further includes smoothing the panning coefficients.

In a still further additional embodiment, a system for upmixing audio, including a processor, and a memory containing an upmixing application that configures the processor to receive an audio track comprising an input plurality of channels, each channel having an encoded audio signal, decode the audio signals, calculate a first frequency spectrum for a low frequency component of the signal using a first window, calculate a second frequency spectrum for a high frequency component of the signal using a second window, determine at least one direct signal by estimating panning coefficients, estimate at least one ambient signal based on the at least one direct signal, and generate an output plurality of channels based on the at least one direct signal and the at least one ambient signal.

In still another embodiment again, the second plurality of channels comprises more channels than the first plurality of channels.

In a still further embodiment again, the upmixing application further directs the processor to determine a spatial representation of the audio track.

In yet another additional embodiment, the input plurality of channels comprises two channels.

In a yet further additional embodiment, the two channels comprise a right and left channel.

In yet another embodiment again, the output plurality of channels comprises a center channel.

In a yet further embodiment again, the center channel is determined using the at least one direct signal and the panning coefficients.

In another additional embodiment again, the upmixing application further directs the processor to apply a decorrelation method to the resulting surround channels.

In a further additional embodiment again, the upmixing application further directs the processor to apply a decorrelation method to the resulting left and right channels In still yet another additional embodiment, the low frequency component comprises frequencies up to 1000 Hz.

In another additional embodiment, to calculate the first frequency spectrum and the second frequency spectrum, the upmixing application directs the processor to use a Short-time Fourier transform (STFT).

In a further additional embodiment, the first window has a length suitable for the STFT to produce 2048 frequency coefficients.

In another embodiment again, the second window has a length suitable for the STFT to produce 128 frequency coefficients.

In a further embodiment again, the upmixing application further directs the processor to smooth the panning coefficients.

Additional embodiments and features are set forth in part in the description that follows, and in part will become apparent to those skilled in the art upon examination of the specification or may be learned by the practice of the invention. A further understanding of the nature and advantages of the present invention may be realized by reference to the remaining portions of the specification and the drawings, which forms a part of this disclosure.

BRIEF DESCRIPTION OF THE DRAWINGS

The description and claims will be more fully understood with reference to the following figures and data graphs, which are presented as exemplary embodiments of the invention and should not be construed as a complete recitation of the scope of the invention.

DETAILED DESCRIPTION

Figure 1:
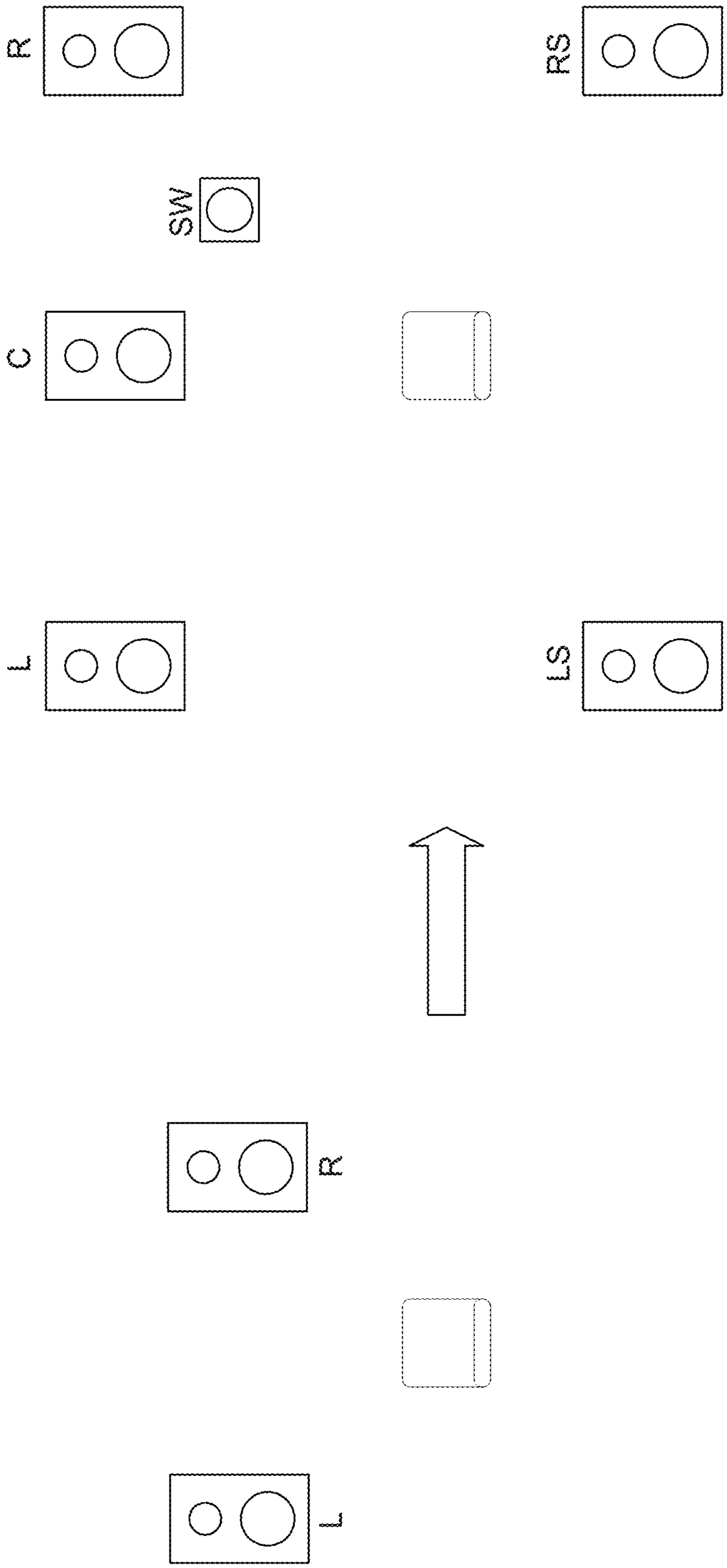
FIG. 1 is a conceptual representation of a stereo to 5.1 channel audio conversion in accordance with an embodiment of the invention.

Advancements in film sound have resulted in an increase in the number of audio channels. As a result, home surround sound systems are becoming more commonplace. Where homes may previously have only had 2-channel stereo systems, 5.1 surround sound and even higher order surround sound systems are now ubiquitous. However, music catalogues, are rarely in a surround sound format. For example, recordings made by the Beatles, often cited as the most influential band of all time, are in mono and stereo. As such, surround sound systems, and even some stereo systems, are unable to provide a surround sound experience when playing back Beatles recordings.

To remedy this, systems and methods described herein provide audio upmixing techniques that enable lower channel audio to be converted into higher channel audio without introducing significant, if any, distortion. Conventional methodologies tend to focus more on cinema audio, and be suboptimal for music reproduction. Further, conventional methodologies can introduce artifacts and/or other distortions to the played back audio. For many applications, systems and methods described herein may need to be performed in near-real time, and therefore increased efficiency over existing methods is beneficial.

For example, home surround sound systems are often provided music as a source input that is not in 1:1 channel format with the speaker layout, but the listener expects for the music they've selected to be immediately played back from all the loudspeakers in their system. As such, a track may need to be upmixed into a higher number of channels immediately with as little lag as possible. Systems and methods described herein can upmix audio tracks to higher channel formats in near real time.

The Discrete Fourier Transform (DFT) is a mathematical method used to analyze the frequency content of audio signals. The Fast Fourier Transform (FFT) is an efficient computational implementation of the DFT that reduces the number of mathematical operations needed for the analysis. In many embodiments, the entire signal is not known in advance. For example, when music is streaming from the internet digital audio samples are arriving continuously in time. The Short-time Fourier Transform (STFT) can be used to determine frequency and phase content of specific time portions (time slices) of the audio signal. The STFT computes the FFT of consecutive time slices of the incoming signal and calculates the frequency content of the signal continuously in time. One issue with STFTs (and the Fourier Transform in general) is that the transform has a fixed resolution. Specifically, the number of coefficients used in the analysis ("FFT Length") determines the frequency resolution of the analyzed frequency content of the signal. In the STFT case, the consecutive time slices are composed of a number of digital audio samples, N, and this slicing process is achieved through the use of a windowing function ("a window"). The number of audio samples per second is called the sampling rate, $f_s$. When the number of coefficients of the FFT is set to be equal to the window size (N), the resulting spacing between analyzed frequencies (frequency resolution) of the FFT is $f_s/N$. That implies that as the number of FFT coefficients (N) increases, the FFT has the ability to resolve frequencies that are closer together. However, an increase in the number of coefficients, N, implies that the size of the window used to create the time slices becomes larger. This results in a reduction of the ability to resolve rapid time changes of the audio signal. This time-frequency resolution tradeoff is one of the fundamental properties of the Fourier Transform. A wider window gives a better frequency resolution, but a worse time resolution. Conversely, a narrower window gives better time resolution, but a worse frequency resolution. An additional downside of using an STFT window that yields high frequency resolution is that significantly more computations are typically performed in order to analyze the frequency content. Systems and methods described herein can leverage this deficiency to increase computational efficiency while maintaining quality by extracting from the audio signals for each channel a number of frequency bands that can then be separately processed.

In various embodiments, the frequency bands are selected by identifying frequency ranges that benefit from high resolution in time and those that benefit from high resolution in frequency. The bands that benefit from high resolution in frequency tend to be lower frequency bands, which can be allocated more compute resources. The power spectra of lower frequency bands in musical audio signals tend to change much more slowly than higher frequencies, but changes in frequency within lower frequency bands are much more noticeable to the human ear (e.g. the perceived difference between a 50 Hz audio signal and a 53 Hz audio signal is significantly more noticeable than from the difference between a 5000 Hz audio signal and a 5003 Hz audio signal). As such, high resolution in frequency is typically more important than high resolution in time for low frequency audio signals in music. In contrast, the power spectra of higher frequency audio signals (where most melody instruments tend to reside, including the human voice) tend to change more rapidly in time, and so high resolution in time is typically more important than high resolution in frequency at higher frequency bands. As is discussed further below, extracting different frequency bands and determining the power spectra of the frequency bands by applying STFT processes using different length time windows to achieve different tradeoffs between frequency and time resolution can reduce processing load within a processing system (e.g. a CPU), and in many embodiments, increase the parallelizability of the processing. As a result, systems and methods in accordance with many embodiments of the invention can achieve low latency, near real-time upmixing of audio signals.

By way of example, turning now to FIG. 1, a conceptual upmix from stereo to 5.1 channel audio in accordance with an embodiment of the invention is illustrated. In many embodiments, a left and right channel stereo track designed to operate on a left speaker (L) and a right speaker (R) can be converted into a 5.1 channel track which includes channels for a left speaker (L), a center speaker (C), a right speaker (R), a left surround speaker (LS), a right surround speaker (RS), and a subwoofer (SW). The placement of the subwoofer relative to the other speakers is less important than the placement of the other speakers relative to each other, as low frequency sound is more difficult for humans to localize. However, stereo to 5.1 upmixing is merely an example, and many other channel upmix configurations are possible without departing from the scope and spirit of the invention. In numerous embodiments, stereo can be upmixed directly to an ambisonic audio format, and/or upmixed into channels representing spatial audio objects which can have associated movement in a virtual space. Ambisonic audio and spatial audio objects are further described in U.S. patent application Ser. No. 16/839,021 titled "Systems and Methods for Spatial Audio Rendering" the entirety of which is hereby incorporated by reference. In various embodiments, resulting upmixed ambient channels can be decorrelated to widen the sense of ambient noise. Audio upmixing processes are discussed further below.

Audio Upmixing Processes

Audio upmixing processes can involve converting an audio track with a given number of channels to a version of the audio track with a higher number of channels. In many embodiments, audio upmixing processes described herein can operate in real time. For example, processes described herein can upmix a stereo audio stream to a 5.1 channel stream which is played back using speakers designed and/or placed to render 5.1 channel audio without noticeable latency to the user. As can be readily appreciated, a stereo to 5.1 upmix is merely an example, and any arbitrary number of channels can be upmixed using processes described herein. However, in order to provide a concrete example to enhance understanding, an upmix from stereo to 5.1 channel surround sound is used as an example below.

Figure 2:
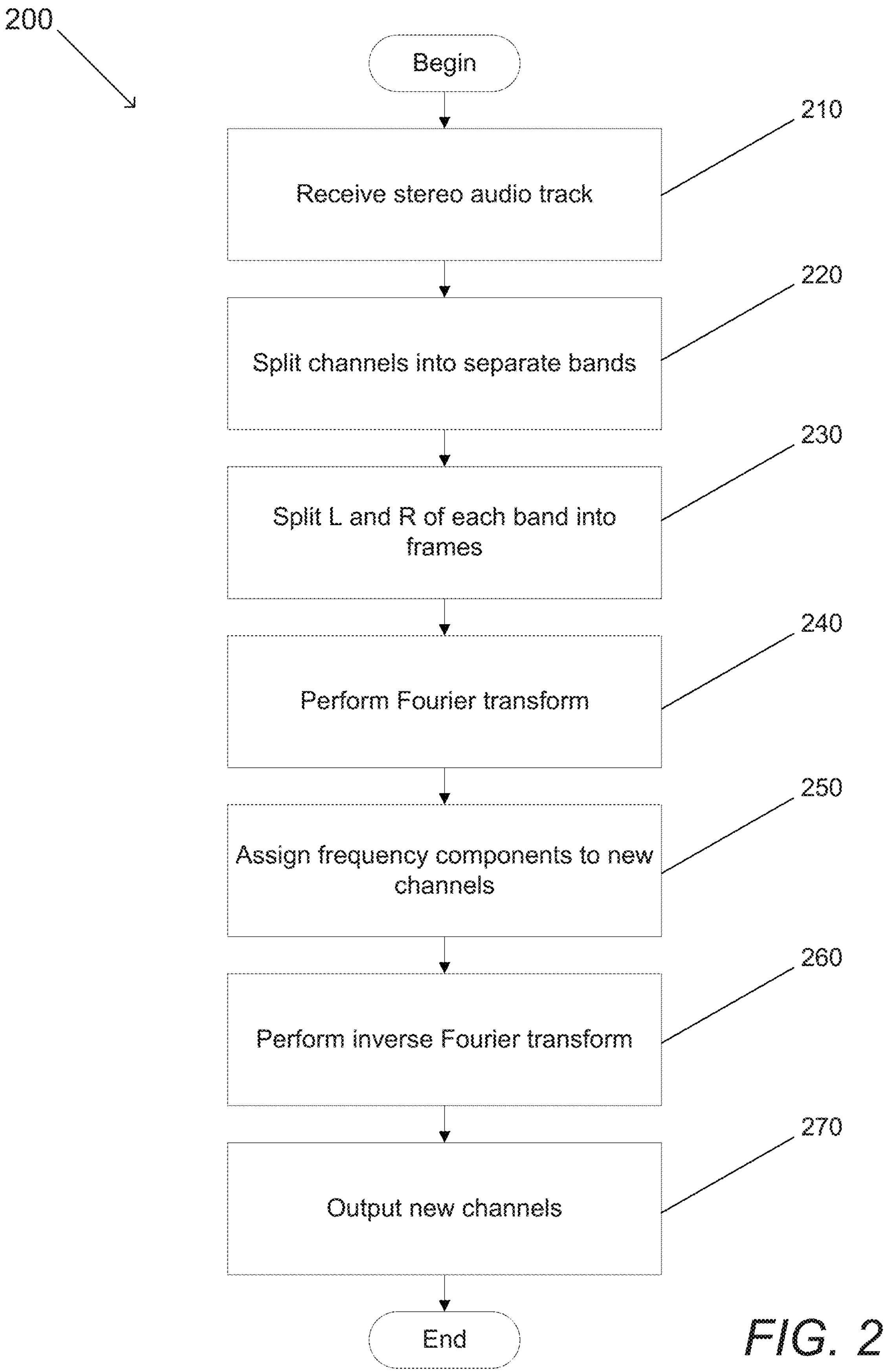
FIG. 2 is an audio upmixing process for generating surround sound audio channels from a stereo track input in accordance with an embodiment of the invention.

Turning now to FIG. 2, an audio upmixing process in accordance with an embodiment of the invention is illustrated. Process 200 includes obtaining (210) a stereo audio track. Stereo audio tracks, as noted above, include 2 channels: left (L) and right (R). Each channel contains an audio signal to be reproduced by the designated speaker. In many embodiments, the audio signal may be digitally encoded. In this case, obtaining the audio signal can include decoding the signal, and operations are performed on the decoded signal. The L and R channels can be split (220) into separate frequency bands. In many embodiments, a high frequency band and a low frequency band are generated using a high pass and/or low pass filter. As can readily be appreciated, the term split can refer to a process in which frequency bands are separated in such a way that frequency components from the original signal contribute to multiple extracted frequency bands (e.g. split frequency bands can include an overlapping band of frequencies created from an array of bandpass filters called a filter bank). In the two band embodiment, the frequency cutoff is at or below 1000 Hz, although many different cutoffs, and even more than one cutoff can be applied (e.g. for lows, mids, and highs) as appropriate to the requirements of specific applications of embodiments of the invention. In various embodiments, multiple bands can be generated depending on the particular frame and/or type of track using filters selected from a filter bank.

Same frequency band L and R channel pairs are split (230) into frames. In many embodiments, frames are generated using a sliding window. The window size can be dependent upon what frequency band is being processed. For example, a high frequency band may have a smaller window size (and therefore frame size) because, when performing an STFT (240) on the frame, high frequencies need high resolution in time but low resolution in frequency, whereas low frequencies need a low resolution in time but higher resolution in frequency.

In many embodiments, the window sizes are allocated such that the high frequency window yields a first number of spectral coefficients (e.g. 128 or fewer spectral coefficients), and the low frequency window yields a second larger number of spectral coefficients (e.g. 2048 or more spectral coefficients). The specific number of spectral frequency coefficients that are generated with respect to each frequency band (and the number of frequency bands) is largely dependent upon the requirements of specific applications in accordance with various embodiments of the invention, and may be tuned based on the particular piece of content and available computational resources. For example, different musical genres may be accounted for using different numbers of spectral coefficients. Indeed, in a number of embodiments the characteristics (e.g. genre) of the music can be specified and/or detected and parameters such as (but not limited to) frequency cutoff(s), and/or number(s) of spectral coefficients with respect to one or more of the frequency bands can be adapted based upon the characteristics of the music. Further, as noted above, multiple frequency bands can be generated, and therefore different window sizes can be used as appropriate to the requirements of specific applications in accordance with various embodiments of the invention. In numerous embodiments, the window utilized to determine the FFT of a given spectral band (e.g. using an STFT) operates in a sliding window fashion and may overlap previously processed samples from the signal. In some embodiments, the window contains between 40%-

60% of samples from samples utilized to determine the FFT of the spectral band (e.g. using an STFT) during a previous time window. However, this number can be adjusted depending on the type of content being processed, the frequency band being processed, and/or any other parameter as appropriate to the requirements of specific applications in accordance with various embodiments of the invention. This splitting can provide significant computational efficiency increases because, as noted, Fourier transforms break up a frequency range into spectral coefficients (or frequency sub-bands called bins), and processing requirements are roughly the square of the number of spectral coefficients.

In many embodiments, the Fourier transform is a Fast Fourier transform (FFT), which may be an implementation of a Short-time Fourier transform (STFT). The frequency components corresponding to the spectral coefficients can be assigned (250) to new channels. An inverse Fourier transform (e.g. an inverse STFT, called iSTFT) can be performed (260) on the spectral coefficients in each new channel to produce new audio signals for each channel. These new audio signals can then be output (270).

Figure 3:
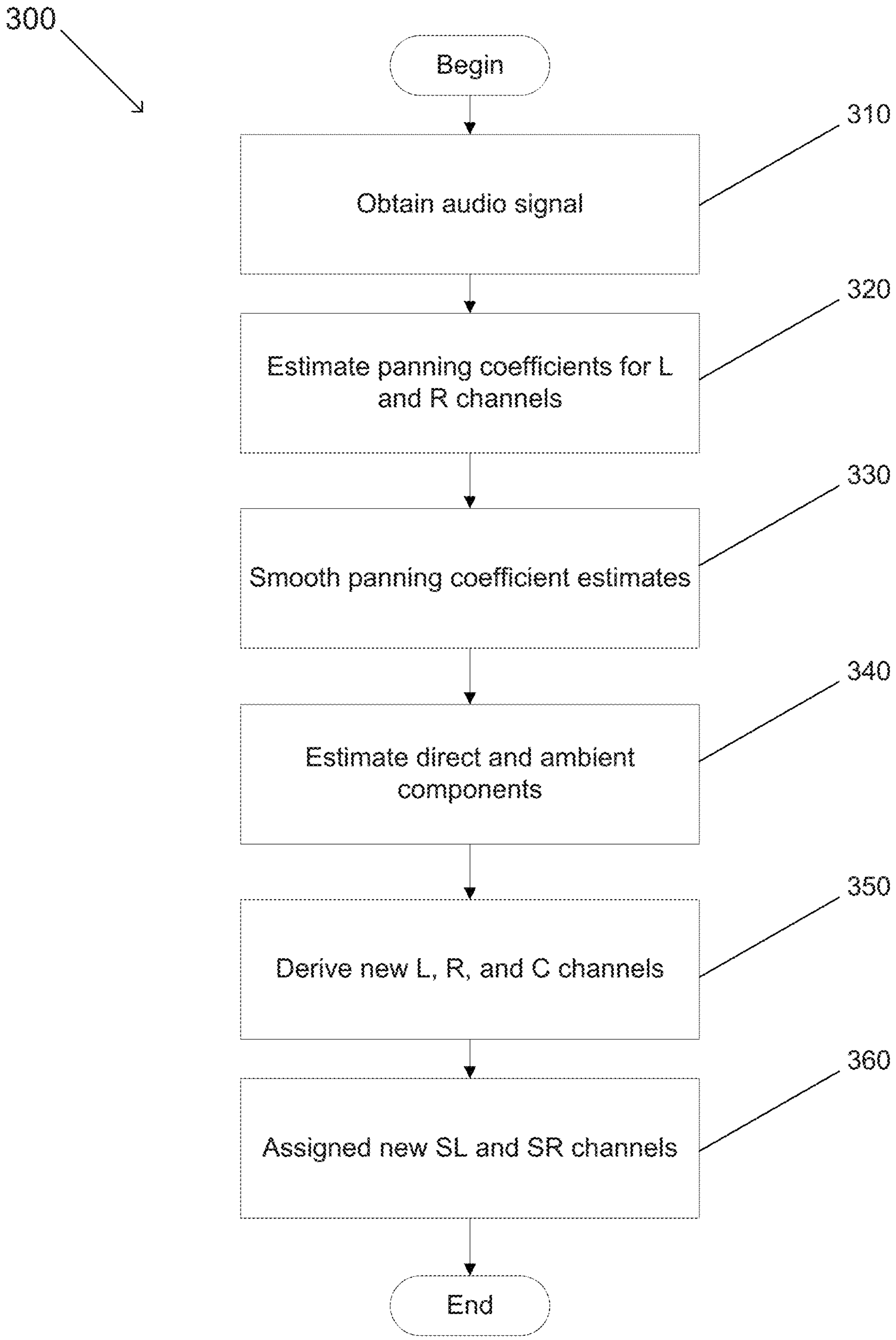
FIG. 3 is an audio upmixing process for assigning frequencies to new channels in accordance with an embodiment of the invention.

Assigning frequency components to new channels can be performed in a number of ways. Turning now to FIG. 3, a process for assigning frequencies to new channels in accordance with an embodiment of the invention is illustrated. Process 300 includes obtaining (310) an audio signal. In many embodiments, the audio signal is a frame which includes an L and R signal at a particular frequency range.

Panning coefficients for the L and R channels are estimated (320). In many embodiments, the stereo signals are represented as a weighted sum of J source signals $d_j(n)$ and a term that corresponds to an uncorrelated ambient signal $n_L(n)$:

$$x_L(n) = \left[\sum_{j=1}^{J} a_{L_j} d_j(n)\right] + n_L(n)$$

$$x_R(n) = \left[\sum_{j=1}^{J} a_{R_j} d_j(n)\right] + n_R(n)$$

Panning coefficients $a_{L_j}$ and $a_{R_j}$ sum as follows for constant power:

$$a_{L_j}^2 + a_{R_j}^2 = 1$$

In the frequency domain, after application of a Fourier transform (e.g. an STFT), the signal model is given as:

$$X_L(b, k) = \left[\sum_{j=1}^{J} a_{L_j} D_j(b, k)\right] + N_L(b, k)$$

$$X_R(b, k) = \left[\sum_{j=1}^{J} a_{R_j} D_j(b, k)\right] + N_R(b, k)$$

In many embodiments, it is assumed that at any given time instant b, and frequency band k, only one dominant source D is active in the track. In various embodiments, it is assumed that the ambient left and right signals have the same amplitude, but different phase (φ) due to variations in path lengths that arise from room acoustic reflections:

$$N_L(b,k) = N(b,k), N_R(b,k) = e^{j\phi} \cdot N(b,k)$$

From the above, a simplified signal model can be written as:

$$N_L(b,k) = a_L(b,k)D(b,k) + N(b,k)$$

$$N_R(b,k) = a_R(b,k)D(b,k) + e^{j\phi}N(b,k)$$

However, it is to be understood that each equation is computed for each time frequency bin as above. As the magnitude of the ambient signal can be assumed to be significantly smaller than that of the direct signal, let:

$$|X_L(b,k)| \approx a_L(b,k)|D(b,k)|$$

$$|X_R(b,k)| \approx a_R(b,k)|D(b,k)|$$

when, which combined with the power summing condition of the panning coefficients, gives an estimate of each coefficient based on the magnitudes of the original left and right channels:

$$\tilde{a}_L(b, k) = \frac{|X_L(b, k)|}{\sqrt{|X_L(b, k)|^2 + |X_R(b, k)|^2}}$$

$$\tilde{a}_R(b, k) = \frac{|X_R(b, k)|}{\sqrt{|X_L(b, k)|^2 + |X_R(b, k)|^2}}$$

In many embodiments, the rate of change between consecutive STFT frames is too fast which can cause audible distortion. In order to resolve this, the estimates of the panning coefficients $\hat{a}_L$ and $\hat{a}_R$ are smoothed (330) over time. In numerous embodiments, smoothing is achieved using an exponential moving averaging filter:

$$\hat{a}_L(b,k) = \gamma_L(b,k)\tilde{a}_L(b,k) + (1-\gamma_L(b,k))\tilde{a}_L(b-1,k)$$

$$\hat{a}_R(b,k) = \gamma_R(b,k)\tilde{a}_R(b,k) + (1-\gamma_R(b,k))\tilde{a}R(b-1,k)$$

where γ is a smoothing coefficient which can be tuned to minimize distortion. However, in some embodiments, smoothing can reduce variance which tends to pull audio towards the center channel. In various embodiments, this is rectified using a different smoothing coefficient ($\gamma_1$ or $\gamma_2$) with a decision-directed approach which reduces artifacts while preserving a wide sound stage. That is, the value for γ may change for each STFT bin calculation. The decision-directed approach can be formalized as:

$$\text{If } \tilde{a}_L(b,k) > \hat{a}_L(b-1,k)\text{; then } \gamma_L = \gamma_1\text{; else } \gamma_L = \gamma_2$$

$$\text{If } \tilde{a}_R(b,k) > \hat{a}_R(b-1,k)\text{; then } \gamma_R = \gamma_1\text{; else } \gamma_R = \gamma_2$$

For notational simplicity, (b,k) is dropped in the equations below. Using the panning coefficients, direct and ambient components can be estimated (340). In many embodiments, using the panning coefficients in the above simplified signal model and solving for direct and ambient signals gives the following estimates:

$$\hat{D} = \frac{X_L e^{j\phi} - X_R}{\hat{a}_L e^{j\phi} - \hat{a}_R}$$

$$\hat{N} = \frac{\hat{a}_L X_R - \hat{a}_R X_L}{\hat{a}_L e^{j\phi} - \hat{a}_R}$$

$$\hat{N}_L = \hat{N} \quad = X_L - \hat{a}_L \hat{D}$$

$$\hat{N}_R = e^{j\phi}\hat{N} \quad = X_R - \hat{a}_R \hat{D}$$

With the estimate of the direct component from the generalized model above, a left, center and right channel can be derived (350) from the original stereo channels (L and R) using vector analysis:

$$X_L=L+\sqrt{0.5}C$$

$$X_R=R+\sqrt{0.5}C$$

In many embodiments, it is assumed that the ambient components are uncorrelated and that the L and R components do not usually contain a common dominant source, so:

$$L\cdot R=0$$

which can be written using the above equation as:

$$(X_L-\sqrt{05}C)\cdot(X_R-\sqrt{0.5}C)=0$$

This produces a quadratic equation for ||C||. In many embodiments, the solution with the negative sign (for minimum energy) is selected to find ||C|| (but it is not required):

$$\|C\|=\sqrt{0.5}(\|X_L+X_R\|-\|X_L-X_R\|)$$

The C channel component can be represented as a vector in the direction of the vector sum of $X_L+X_R$ and is weighted by the magnitude estimate ||C||:

$$C=\frac{(X_L+X_R)\|C\|}{\|X_L+X_R\|+\varepsilon}$$

In many embodiments, the center channel can alternatively be estimated instead by using: $D_L=a_L\times D$ and $D_R=a_R\times D$ to estimate ||C|| and C using the panning coefficients above. Once the center channel is determined, new L and R channels can be found by subtracting the Center channel from the original L and R:

$$L=X_L-\sqrt{0.5}C$$

$$R=X_R=\sqrt{0.5}C$$

Left and right surround channels are assigned (360) as the left and right ambient estimates above. In some embodiments, it is advantageous to further process the surround channels using decorrelation. While some degree of decorrelation is achieved through the addition of a phase rotation in one of the two channels, several other methods for decorrelation can be used. In some embodiments in which a realistic acoustic reproduction is desired, the L, R, and C channels are intended to be precisely localized by the listener while the surround channels (LS and RS) are intended to sound diffuse and not localizable. This can be achieved by adding a decorrelation processing block to the surround signals prior to directing them to the loudspeakers. Decorrelation methods include phase changes, frequency-dependent delay, frequency subband based randomization of phase, all-pass filters and other methods. These methods can be particularly advantageous when the surround channel is directed to a single loudspeaker behind the listener as is described in U.S. patent application Ser. No. 16/839,021 titled "Systems and Methods for Spatial Audio Rendering". In some embodiments, decorrelation can be applied to the upmixed $X_L$ and $X_R$ signals to enhance the spatial impression of the track when all of the upmixed channels are reproduced from a single loudspeaker (as is described in U.S. patent application Ser. No. 16/839,021 titled "Systems and Methods for Spatial Audio Rendering") placed in front of the listener.

Figure 4:
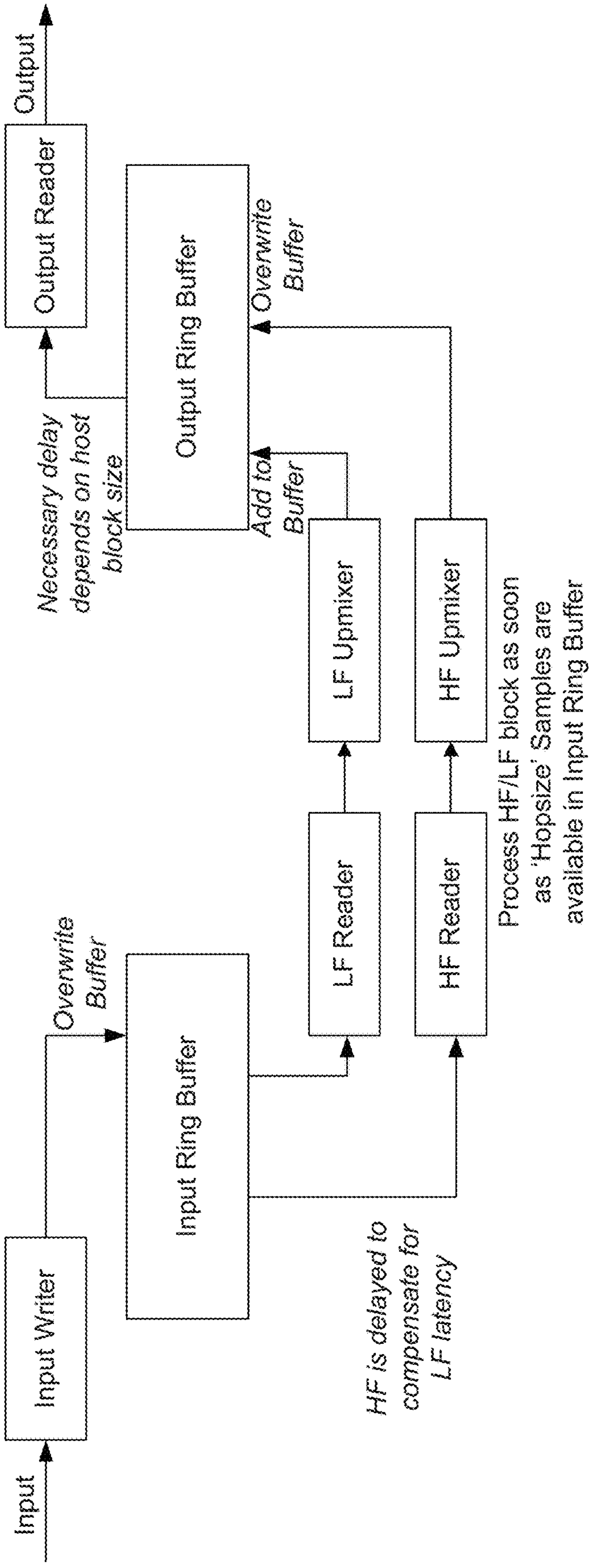
FIG. 4 is a flow chart for an audio upmixing process in accordance with an embodiment of the invention.
Figure 5:
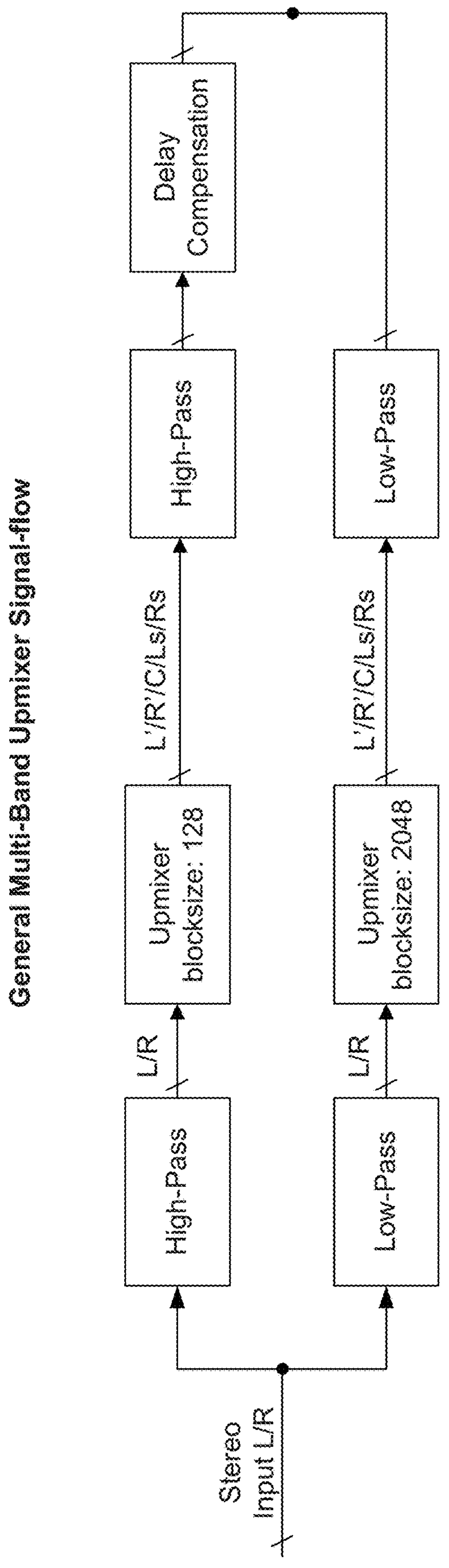
FIG. 5 is a flow chart for an audio upmixing process in accordance with an embodiment of the invention.
Figure 6:
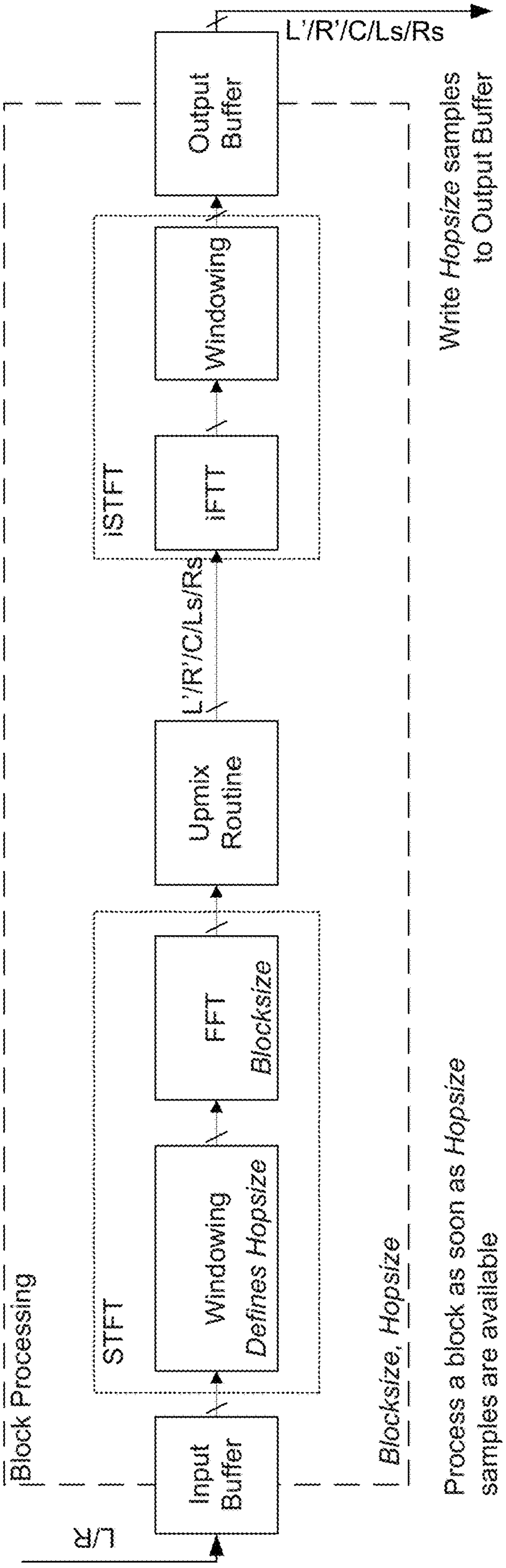
FIG. 6 is a flow chart for another audio upmixing process in accordance with an embodiment of the invention.
Figure 7:
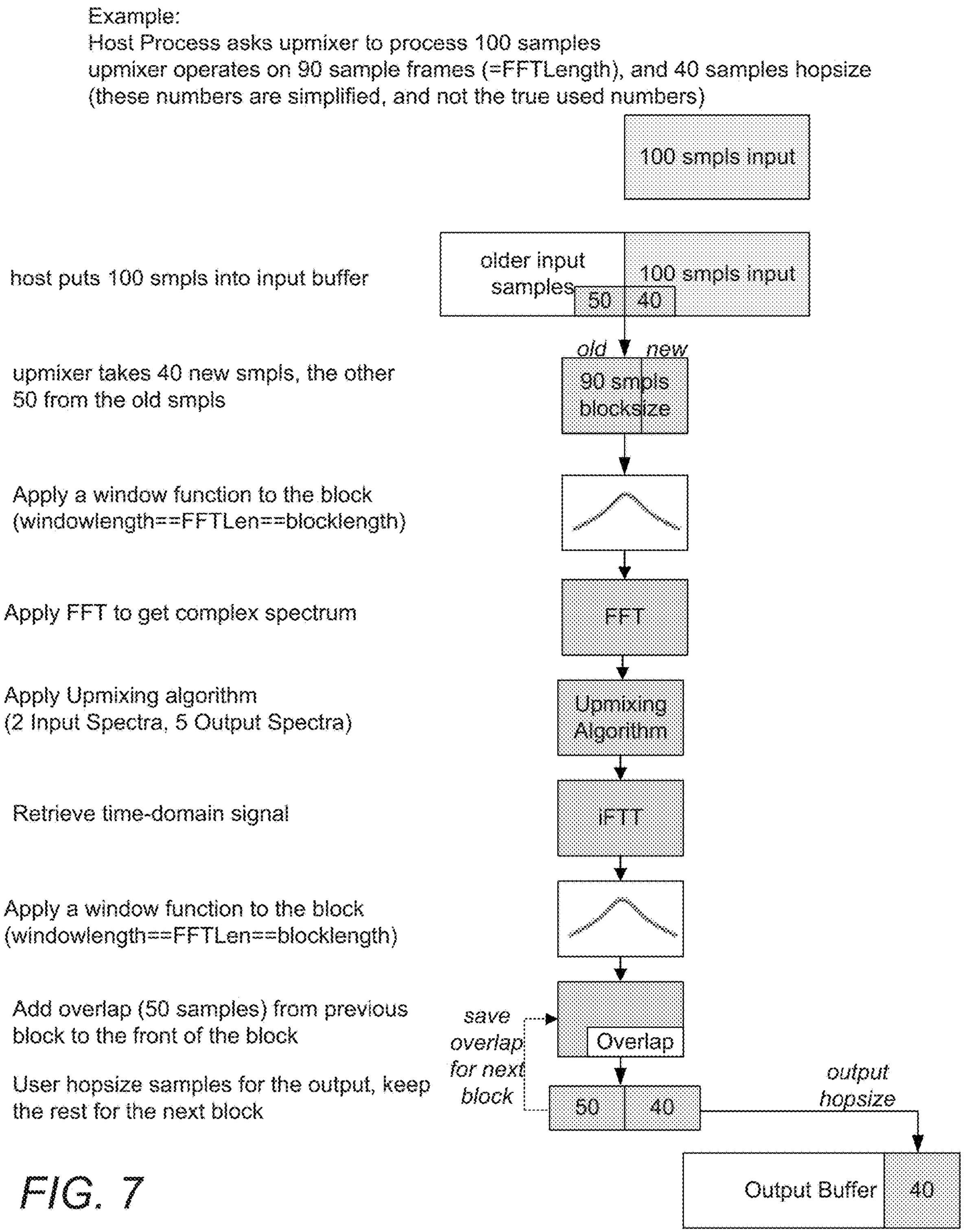
FIG. 7 is a flow chart for yet another audio upmixing process in accordance with an embodiment of the invention.

While a particular method for upmixing and assigning frequencies to new channels are illustrated in FIGS. 2 and 3, one of ordinary skill in the art can appreciate that many steps can be performed in different orders or with additional intermediate steps without departing from the scope or spirit of the invention. For example, many different pipelines can be implemented as appropriate to the requirements of specific applications of embodiments of the invention. By way of example, FIG. 4 illustrates a high level flow chart for upmixing in accordance with an embodiment of the invention. By way of further example, FIG. 5 illustrates a general multi-band upmixer signal flow diagram in accordance with an embodiment of the invention. By way of yet further example, FIG. 6 illustrates a flow chart for an upmixing pipeline in accordance with an embodiment of the invention. By way of yet further example again, FIG. 7 illustrates a flow chart for an upmixing pipeline in accordance with an embodiment of the invention. As can be readily appreciated, any number of different implementations can be used without departing from the scope or spirit of the invention. Upmixer systems are discussed in further detail below.

Upmixing Systems

Upmixing systems in accordance with many embodiments of the system can upmix audio tracks in near real time to enable a pleasing live listening experience on surround sound audio setups being fed by suboptimal input channel configurations. In many embodiments, the upmixing is performed on streaming media content with an imperceptible amount of latency as experienced by the listener. However, upmixing systems can perform on any number of tracks provided in a non-live context as well.

Figure 8:
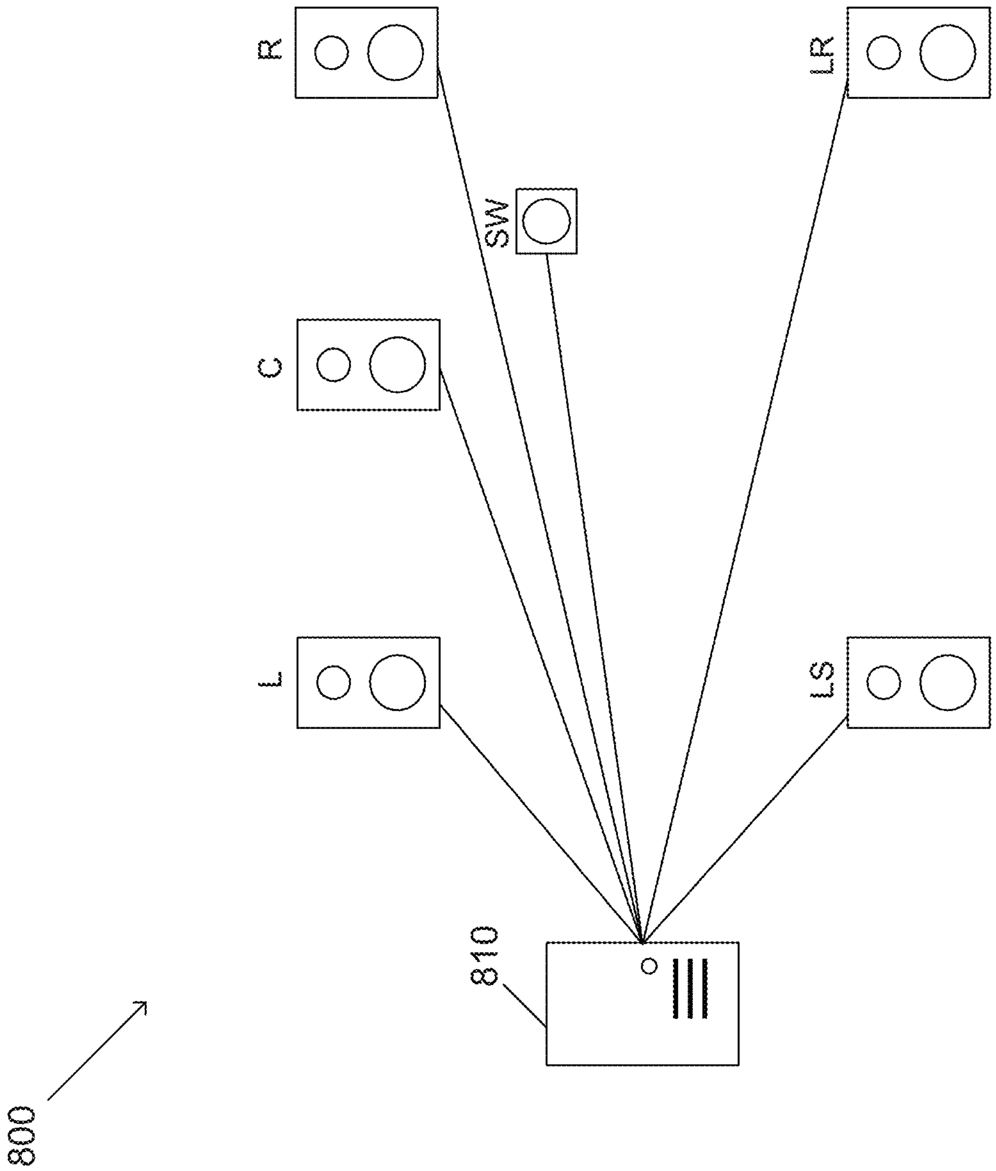
FIG. 8 is an audio upmixing system in accordance with an embodiment of the invention.

Turning now to FIG. 8, an upmixing system in accordance with an embodiment of the invention is illustrated. System 800 includes an audio upmixer 810 in communication with a 5 channel surround sound system. As noted above, any arbitrary surround sound system with any arbitrary number of speakers/channels can be connected as appropriate to the requirements of specific applications of embodiments of the invention. The audio upmixer can receive an audio track that is not optimized for the particular speaker layout connected, and generate the correct number of channels for the particular speaker layout. In many embodiments, the upmix is from stereo to 5.1 channel surround sound. However, it is important to note that 5.1 channel surround sound can be further upmixed to any arbitrary surround sound channel layout as appropriate to the requirements of specific applications in accordance with various embodiments of the invention.

Figure 9:
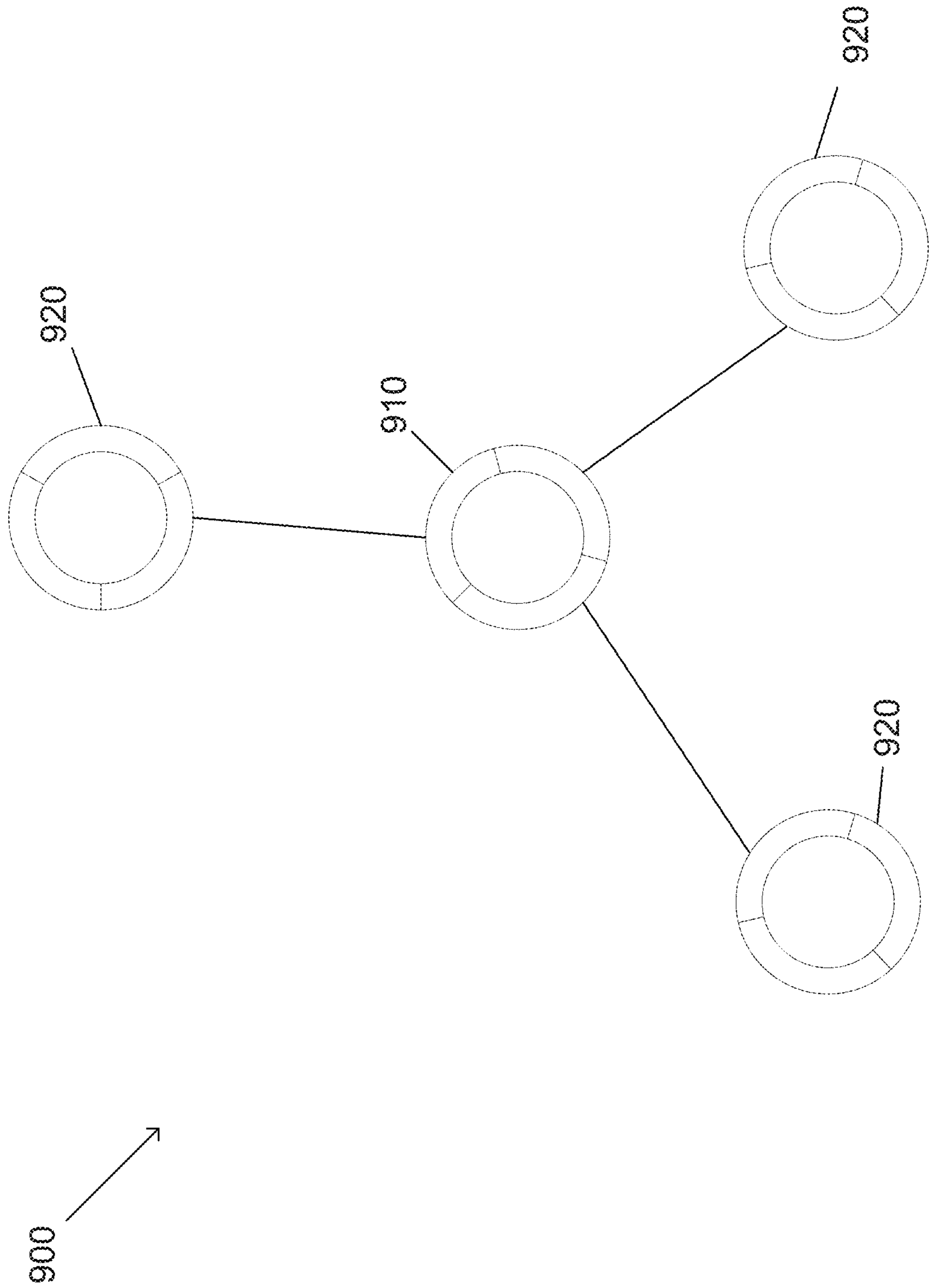
FIG. 9 is an audio upmixing system for rendering spatial audio in accordance with an embodiment of the invention.

Further, in many embodiments, the connected speaker layout may be a spatial audio system such as that described in U.S. patent application Ser. No. 16/839,021. In various embodiments, the audio upmixer can provide upmixed audio as input to a virtual speaker layout used to render spatial audio. An audio upmixer connected to an example spatial audio system in accordance with an embodiment of the invention is illustrated in FIG. 9. In system 900, a primary cell 910 operates as the audio upmixer and provides data to secondary cells 920.

Figure 10:
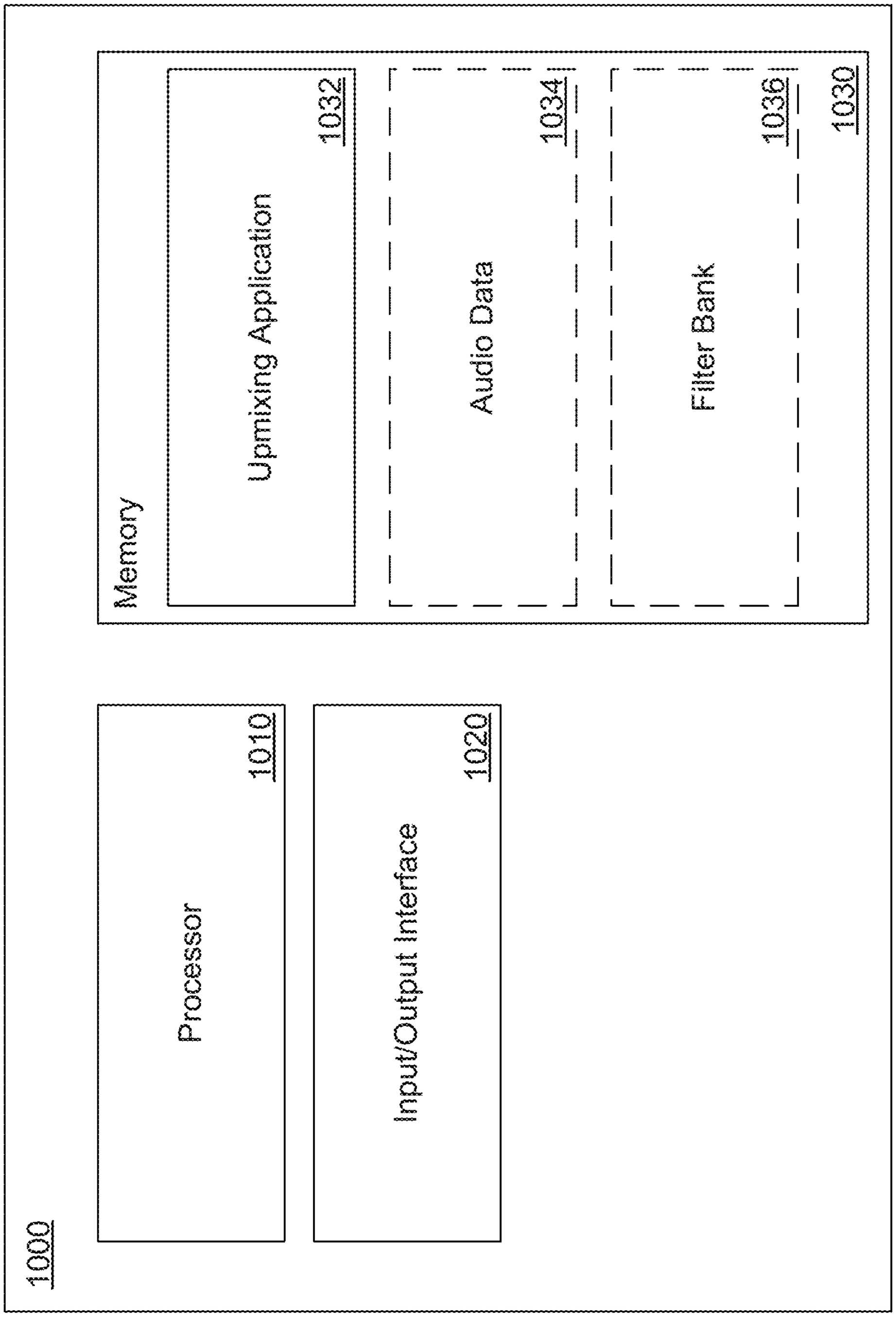
FIG. 10 is an audio upmixer in accordance with an embodiment of the invention.

Turning now to FIG. 10, a block diagram for an audio upmixer in accordance with an embodiment of the invention is illustrated. Audio upmixer 1000 includes a processor 1010. In numerous embodiments, more than one processor is used, and/or a combination of processors and coprocessors. In numerous embodiments, the processor is a central processing unit (CPU), a graphics processing unit (GPU), an application specific integrated circuit (ASIC), field-programmable gate-array (FPGA), and/or any other logic circuit as appropriate to the requirements of specific applications of embodiments of the invention. The audio upmixer 1000 further includes an input/output (I/O) interface 1020.

I/O interfaces can be any component that enables communication between the audio upmixer, connected speakers, audio track sources, and/or any other device as appropriate to the requirements of specific applications of embodiments of the invention (e.g. a control device). In many embodiments, the I/O interface includes one or more transceivers, receivers, transmitters, or wired ports as appropriate to the requirements of specific applications of embodiments of the invention.

The audio upmixer 1000 further includes a memory 1030. The memory can be implemented using volatile memory, nonvolatile memory, or any combination thereof. The memory contains an upmixing application 1032 which can configure the processor to perform various audio upmixing processes. In many embodiments, the memory further contains audio data 1034 which describes one or more audio tracks, and/or a filter bank 1036. In many embodiments, the filter bank is a data structure that contains a list of different bandpass filters to use in splitting channels as described above. However, in many embodiments, the filter bank can be implemented as its own distinct circuit.

While particular audio upmixing systems are illustrated in FIGS. 8 and 9, and a particular audio upmixer is illustrated in FIG. 10, one of ordinary skill in the art can readily appreciate that any number of system architectures and hardware implementations can be used without departing form the scope or spirit of the invention. Indeed, Although specific systems and methods for audio upmixing are discussed above, many different fabrication methods can be implemented in accordance with many different embodiments of the invention. It is therefore to be understood that the present invention may be practiced in ways other than specifically described, without departing from the scope and spirit of the present invention. Thus, embodiments of the present invention should be considered in all respects as illustrative and not restrictive. Accordingly, the scope of the invention should be determined not by the embodiments illustrated, but by the appended claims and their equivalents.

What is claimed is:

1. A method for upmixing audio, comprising:
receiving an audio track comprising an input plurality of channels, each channel having an encoded audio signal;
decoding the audio signals;
for each decoded audio signal:
calculating a first frequency spectrum for a low frequency component of the decoded audio signal using a first window;
calculating a second frequency spectrum for a high frequency component of the decoded audio signal using a second window;
assigning components from the first and second frequency spectrums to at least one direct signal by estimating panning coefficients of the decoded audio signals;
estimating at least one ambient signal based on the at least one direct signal; and
generating an output plurality of channels based on the at least one direct signal and the at least one ambient signal.

2. The method for upmixing audio of claim 1, wherein the output plurality of channels comprises more channels than the input plurality of channels.

3. The method for upmixing audio of claim 1, further comprising determining a spatial representation of the audio track.

4. The method for upmixing audio of claim 1, wherein the input plurality of channels comprises two channels.

5. The method for upmixing audio of claim 4, wherein the two channels comprise a right and left channel.

6. The method for upmixing audio of claim 1, wherein the output plurality of channels comprises a center channel.

7. The method for upmixing audio of claim 6, wherein the center channel is determined using the at least one direct signal and the panning coefficients.

8. The method for upmixing audio of claim 1, wherein a decorrelation method is applied to surround channels of the output plurality of channels.

9. The method for upmixing audio of claim 1, wherein a decorrelation method is applied to left and right channels of the output plurality of channels.

10. The method for upmixing audio of claim 1, wherein the low frequency component comprises frequencies up to 1000 Hz.

11. The method for upmixing audio of claim 1, wherein calculating the first frequency spectrum and calculating the second frequency spectrum comprises using a Short-time Fourier transform (STFT).

12. The method for upmixing audio of claim 11, wherein the first window has a length suitable for the STFT to produce 2048 frequency coefficients.

13. The method for upmixing audio of claim 11, wherein the second window has a length suitable for the STFT to produce 128 frequency coefficients.

14. The method for upmixing audio of claim 1, further comprising smoothing the panning coefficients.

15. A system for upmixing audio, comprising:
a processor; and
a memory containing an upmixing application that configures the processor to:
receive an audio track comprising an input plurality of channels, each channel having an encoded audio signal;
decode the audio signals;
for each decoded audio signal of the decoded audio signals:
calculate a first frequency spectrum for a low frequency component of the decoded audio signal using a first window;
calculate a second frequency spectrum for a high frequency component of the decoded audio signal using a second window;
assign components from the first and second frequency spectrums to at least one direct signal by estimating panning coefficients of the decoded audio signals;
estimate at least one ambient signal based on the at least one direct signal; and
generate an output plurality of channels based on the at least one direct signal and the at least one ambient signal.

16. The system for upmixing audio of claim 15, wherein the output plurality of channels comprises more channels than the input plurality of channels.

17. The system for upmixing audio of claim 15, wherein the upmixing application further directs the processor to determine a spatial representation of the audio track.

18. The system for upmixing audio of claim 15, wherein the input plurality of channels comprises two channels.

19. The system for upmixing audio of claim 18, wherein the two channels comprise a right and left channel.

20. The system for upmixing audio of claim 15, wherein the output plurality of channels comprises a center channel.

21. The system for upmixing audio of claim 20, wherein the center channel is determined using the at least one direct signal and the panning coefficients.

22. The system for upmixing audio of claim 15, wherein the upmixing application further directs the processor to apply a decorrelation method to the surround channels of the output plurality of channels.

23. The system for upmixing audio of claim 15, wherein the upmixing application further directs the processor to apply a decorrelation method to left and right channels of the output plurality of channels.

24. The system for upmixing audio of claim 15, wherein the low frequency component comprises frequencies up to 1000 Hz.

25. The system for upmixing audio of claim 15, wherein to calculate the first frequency spectrum and the second frequency spectrum, the upmixing application directs the processor to use a Short-time Fourier transform (STFT).

26. The system for upmixing audio of claim 25, wherein the first window has a length suitable for the STFT to produce 2048 frequency coefficients.

27. The system for upmixing audio of claim 25, wherein the second window has a length suitable for the STFT to produce 128 frequency coefficients.

28. The system for upmixing audio of claim 15, wherein the upmixing application further directs the processor to smooth the panning coefficients.

* * * * *